US009423846B2

(12) United States Patent
Smith et al.

(10) Patent No.: US 9,423,846 B2
(45) Date of Patent: Aug. 23, 2016

(54) POWERED RING TO MAINTAIN IO STATE INDEPENDENT OF THE CORE OF AN INTEGRATED CIRCUIT DEVICE

(75) Inventors: Brian Smith, Mountain View, CA (US); Ewa Kubalska, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 919 days.

(21) Appl. No.: 12/101,028

(22) Filed: Apr. 10, 2008

(65) Prior Publication Data

US 2009/0256607 A1    Oct. 15, 2009

(51) Int. Cl.
| G06F 1/00 | (2006.01) |
| G06F 1/26 | (2006.01) |
| G06F 1/32 | (2006.01) |

(52) U.S. Cl.
CPC ........................................ *G06F 1/32* (2013.01)

(58) Field of Classification Search
USPC ................................. 713/300, 323, 324, 320
See application file for complete search history.

(56) References Cited

U.S. PATENT DOCUMENTS

| 4,868,832 | A |   | 9/1989  | Marrington et al. |
| 5,109,494 | A |   | 4/1992  | Ehlig et al. |
| 5,142,690 | A |   | 8/1992  | McMullan, Jr. et al. |
| 5,220,660 | A |   | 6/1993  | Yoshizawa et al. |
| 5,230,067 | A |   | 7/1993  | Buch |
| 5,274,828 | A | * | 12/1993 | McAdams ................... 713/300 |
| 5,305,443 | A |   | 4/1994  | Franzo |
| 5,339,445 | A |   | 8/1994  | Gasztonyi |
| 5,386,552 | A |   | 1/1995  | Garney |
| 5,388,265 | A |   | 2/1995  | Volk |
| 5,396,635 | A |   | 3/1995  | Fung |
| 5,402,492 | A |   | 3/1995  | Goodman et al. |
| 5,408,668 | A |   | 4/1995  | Tornai |
| 5,446,904 | A |   | 8/1995  | Belt et al. |
| 5,471,189 | A |   | 11/1995 | Dietz et al. |
| 5,510,740 | A |   | 4/1996  | Farrell et al. |
| 5,517,441 | A |   | 5/1996  | Dietz et al. |
| 5,524,249 | A |   | 6/1996  | Suboh |
| 5,528,610 | A |   | 6/1996  | Edler et al. |
| 5,530,845 | A |   | 6/1996  | Hiatt et al. |
| 5,535,398 | A |   | 7/1996  | Biggs et al. |

(Continued)

FOREIGN PATENT DOCUMENTS

| GB | 2457170 | 8/2009 |
| WO | 2004102623 | 11/2004 |

OTHER PUBLICATIONS

Application as Filed; U.S. Appl. No. 12/029,442; Brian Smith; et al., filed Feb. 11, 2008.

(Continued)

*Primary Examiner* — Idriss N Alrobaye
*Assistant Examiner* — Getente A Yimer (57) ABSTRACT

In an integrated circuit device, a power circuit for maintaining asserted values on an input output pin of the device when a functional block of the device is placed in a sleep mode. The device includes a power circuit disposed along the periphery of the device, the power circuit configured to maintain power when the device is placed in a low-power mode. A plurality of input output blocks are included in the device and are for receiving external inputs for the integrated circuit device and for providing outputs from the integrated circuit device. The power circuit is coupled to provide power to at least one of the input output blocks to maintain state when the integrated circuit device is in the low-power mode.

14 Claims, 5 Drawing Sheets

(56) References Cited

U.S. PATENT DOCUMENTS

| | | |
|---|---|---|
| 5,557,777 A | 9/1996 | Culbert |
| 5,586,308 A | 12/1996 | Hawkins et al. |
| 5,588,099 A | 12/1996 | Mogilevsky et al. |
| 5,594,367 A | 1/1997 | Trimberger et al. |
| 5,594,874 A | 1/1997 | Narayanan et al. |
| 5,649,222 A | 7/1997 | Mogilevsky |
| 5,659,687 A | 8/1997 | Kim et al. |
| 5,687,382 A | 11/1997 | Kojima et al. |
| 5,737,613 A | 4/1998 | Mensch, Jr. |
| 5,752,050 A | 5/1998 | Hernandez et al. |
| 5,758,133 A | 5/1998 | Envoy |
| 5,790,877 A | 8/1998 | Nishiyama et al. |
| 5,862,368 A | 1/1999 | Miller et al. |
| 5,869,979 A | 2/1999 | Bocchino |
| 5,898,879 A | 4/1999 | Kim |
| 5,951,689 A | 9/1999 | Evoy et al. |
| 5,963,219 A | 10/1999 | Choi |
| 6,029,170 A | 2/2000 | Garger et al. |
| 6,034,544 A | 3/2000 | Agrawal et al. |
| 6,040,845 A | 3/2000 | Melo et al. |
| 6,057,705 A | 5/2000 | Wojewoda et al. |
| 6,061,679 A | 5/2000 | Bournas et al. |
| 6,134,167 A | 10/2000 | Atkinson |
| 6,163,583 A | 12/2000 | Lin et al. |
| 6,169,546 B1 | 1/2001 | Bogdan |
| 6,169,984 B1 | 1/2001 | Bogdan |
| 6,178,523 B1 | 1/2001 | Klein |
| 6,191,969 B1 | 2/2001 | Pereira |
| 6,191,970 B1 | 2/2001 | Pereira |
| 6,212,645 B1 | 4/2001 | Tjandrasuwita |
| 6,216,234 B1 | 4/2001 | Sager et al. |
| 6,243,280 B1 | 6/2001 | Wong et al. |
| 6,249,284 B1 | 6/2001 | Bogdan |
| 6,266,776 B1 | 7/2001 | Sakai |
| 6,347,370 B1 | 2/2002 | Grimsrud |
| 6,380,764 B1 | 4/2002 | Katoh et al. |
| 6,397,340 B2 | 5/2002 | Watts, Jr. et al. |
| 6,493,856 B2 | 12/2002 | Usami et al. |
| 6,523,128 B1 | 2/2003 | Stapleton et al. |
| 6,538,947 B2 | 3/2003 | Ahmed et al. |
| 6,552,596 B2 * | 4/2003 | Cowles et al. ............... 327/318 |
| 6,584,003 B1 | 6/2003 | Kim et al. |
| 6,600,575 B1 | 7/2003 | Kohara |
| 6,678,831 B1 | 1/2004 | Mustafa et al. |
| 6,694,451 B2 | 2/2004 | Atkinson |
| 6,717,435 B1 | 4/2004 | Mitsumori et al. |
| 6,728,959 B1 | 4/2004 | Merkey |
| 6,754,837 B1 | 6/2004 | Helms |
| 6,760,850 B1 | 7/2004 | Atkinson et al. |
| 6,762,768 B2 | 7/2004 | Dilliplane |
| 6,765,958 B1 | 7/2004 | Dowling |
| 6,768,659 B2 | 7/2004 | Gillingham et al. |
| 6,775,776 B1 | 8/2004 | Vogt et al. |
| 6,804,267 B1 | 10/2004 | Long et al. |
| 6,804,763 B1 | 10/2004 | Stockdale et al. |
| 6,816,809 B2 | 11/2004 | Circenis |
| 6,845,434 B2 | 1/2005 | Lin |
| 6,845,456 B1 | 1/2005 | Menezes et al. |
| 6,901,298 B1 | 5/2005 | Govindaraj et al. |
| 6,990,594 B2 | 1/2006 | Kim |
| 7,007,247 B1 | 2/2006 | Wang et al. |
| 7,043,649 B2 | 5/2006 | Terrell, II |
| 7,058,834 B2 | 6/2006 | Woods et al. |
| 7,100,013 B1 | 8/2006 | de Waal |
| 7,174,472 B2 | 2/2007 | Hill |
| 7,187,205 B2 * | 3/2007 | Ramaraju ......... H03K 3/356008 326/38 |
| 7,243,318 B1 | 7/2007 | Mirza et al. |
| 7,256,232 B2 | 8/2007 | Lamaze et al. |
| 7,285,980 B2 | 10/2007 | Bansal et al. |
| 7,372,298 B2 | 5/2008 | Chu et al. |
| 7,401,240 B2 | 7/2008 | Heller, Jr. et al. |
| 7,414,550 B1 | 8/2008 | Sudharsanan |
| 7,426,647 B2 | 9/2008 | Fleck et al. |
| 7,428,644 B2 | 9/2008 | Jeddeloh et al. |
| 7,432,921 B2 | 10/2008 | Oshima et al. |
| 7,434,072 B2 | 10/2008 | Peirson et al. |
| 7,518,399 B1 * | 4/2009 | Santurkar ......... H03K 19/0016 326/38 |
| 7,529,958 B2 * | 5/2009 | Roth et al. ................... 713/330 |
| 7,583,104 B2 * | 9/2009 | Simmons et al. ............. 326/82 |
| 7,590,815 B1 | 9/2009 | de Waal |
| 7,599,317 B2 | 10/2009 | Schaap |
| 7,624,215 B2 | 11/2009 | Axford et al. |
| 7,631,117 B2 | 12/2009 | Aida et al. |
| 7,698,586 B2 | 4/2010 | Kim et al. |
| 7,730,248 B2 | 6/2010 | Goss et al. |
| 7,739,533 B2 | 6/2010 | Rauschmayer et al. |
| 7,945,875 B2 | 5/2011 | Anand et al. |
| 7,954,078 B1 | 5/2011 | Wang et al. |
| 8,327,173 B2 | 12/2012 | Hendin et al. |
| 2001/0044909 A1 | 11/2001 | Oh et al. |
| 2002/0172008 A1 | 11/2002 | Michael |
| 2003/0023825 A1 | 1/2003 | Woo et al. |
| 2003/0093702 A1 * | 5/2003 | Luo et al. ................... 713/320 |
| 2003/0204757 A1 | 10/2003 | Flynn |
| 2003/0204761 A1 | 10/2003 | D'Alessio |
| 2003/0206164 A1 | 11/2003 | Juenger |
| 2003/0233525 A1 | 12/2003 | Reeves |
| 2004/0128574 A1 * | 7/2004 | Ricci et al. ................... 713/320 |
| 2005/0015321 A1 | 1/2005 | Vindekilde |
| 2005/0125705 A1 | 6/2005 | Cheng et al. |
| 2006/0184808 A1 | 8/2006 | Chua-Eoan et al. |
| 2006/0226895 A1 | 10/2006 | Hoshi et al. |
| 2007/0300092 A1 * | 12/2007 | Kurita ........................ 713/323 |
| 2008/0155282 A1 * | 6/2008 | Gammie et al. ............. 713/300 |
| 2008/0307240 A1 | 12/2008 | Dahan et al. |
| 2009/0049220 A1 | 2/2009 | Conti et al. |
| 2009/0054075 A1 | 2/2009 | Boejer et al. |
| 2009/0070621 A1 * | 3/2009 | Yanagi ........................... 714/3 |
| 2009/0204831 A1 | 8/2009 | Cousson et al. |
| 2009/0204835 A1 * | 8/2009 | Smith et al. ................. 713/323 |
| 2009/0210831 A1 | 8/2009 | Correale et al. |
| 2009/0256607 A1 * | 10/2009 | Smith ....................... G06F 1/32 327/198 |
| 2009/0271167 A1 | 10/2009 | Zhu et al. |
| 2010/0064271 A1 | 3/2010 | Chen |
| 2010/0308895 A1 * | 12/2010 | Koushanfar ...... G01R 31/31835 327/524 |

OTHER PUBLICATIONS

Application as Filed; U.S. Appl. No. 12/029,404; Brian Smith; et al., filed Feb. 11, 2008.

Application as Filed; U.S. Appl. No. 12/101,055; Tom Verveure; filed Apr. 10, 2008.

IEEE Journal of Solid-State Circuits, vol. 42, No. 1 Jan. 2007.

* cited by examiner

POWERED RING TO MAINTAIN IO STATE INDEPENDENT OF THE CORE OF AN INTEGRATED CIRCUIT DEVICE

FIELD OF THE INVENTION

The present invention is generally related to digital computer systems.

BACKGROUND OF THE INVENTION

One of the important features of integrated circuits deigned for portable applications is their ability to efficiently utilize the limited capacity of the battery power source. Typical applications include cellular telephones and personal digital assistants (PDAs), which might have a Lithium ion battery or two AAA alkaline batteries as the power source. Users have come to expect as much as three to four weeks of standby operation using these devices. Standby operation refers to the situation where the cellular phone, handheld device, etc. is powered on but not being actively used (e.g., actively involved in a call). Generally, it is estimated that the integrated circuits providing the functionality of the device is only performing useful work approximately 2% of the time while the device is in standby mode.

Removing the power supply from selected circuits of a device during standby is a technique employed by designers for battery powered applications. The technique is generally applied only to circuit blocks outside of the central processing unit (CPU). A primary reason for not applying this technique to CPUs, has been the difficulty in being able to restore the current processor state information necessary to continue execution after coming out of the standby mode. One solution for this limitation involves saving the current processor state information to external storage mechanisms (e.g., such as flash memory, a hard disk drive, etc.). In such a case there is the overhead required in transferring the state to and from the external storage mechanism. Even if the battery powered device had a hard disk drive, and many don't, the time consuming state transfer may not meet the real time response requirements of the application when the device needs to wake up to respond to a new event.

Other issues are presented when the functionality of a device is implemented by a system-on-a-chip (SOC) integrated circuit. For example, when the core of a system-on-a-chip CPU is temporarily powered down (e.g., deep sleep mode), some of the outputs that connect to assorted peripherals (e.g. LCD display, SPI interface, SDIO, Hard-disk, etc.) should be held in an idle state to avoid having to reprogram the peripheral or lose existing context in the peripheral. This causes a problem since some peripherals need particular values to be set at their inputs (which are connected to the outputs of the SOC) to hold a safely inactive state. For example, if a device is connected to a SOC that is clocked on the falling edge of a clock signal, and the SOC is powered down with that signal as a logic 1, but the power down state is a logic 0 (e.g., ground), it will cause a spurious clock on that signal.

This problem is further exacerbated by the heavy use of pin-muxing or sharing, in which a single pin can have multiple functions in different designs by different customers. In one design a pin may be set to act as part of an SPI interface that wants to be held low when in sleep mode, while the same pin in another design, perhaps by a different customer may be used as a UART pin which would need to be held high when the CPU is put to deep sleep mode. While pin-muxing provides a way to put more features in each chip and allows the chip to be more suitable for a wide range of designs, it precludes knowing exactly at IC design time what each pin will be used for. A more flexible method of configuring the power down states is needed.

One solution to this problem would be to have a register for each pin that drives the pin to any one of the allowed number of states, such as: Input, output 0, output 1, output Hi-Z, open drain, etc. This is a workable solution, but has a problem that since normally the signals that control these functions come from the core of the SOC, they will not be present when the core is powered down in deep sleep mode. To overcome this, a second set of registers on the SOC on a special power domain (AO) which remains powered when the rest of the core is powered down in deep sleep mode is used to control the pins.

The special power domain allows the state information of these IO pads to be preserved. However the big problem is that it requires many signals from the portion of the chip that is in the special power domain to be routed to each pad. For example, with 300 signal pads and 3 wires per pad, as many as 900 traces have to be routed on the integrated circuit die, which is a large number at the top level of an integrated circuit die layout. These pad control signals must also be powered by the AO rail, which complicates the distribution of this AO rail or the routing of these pad control signals. The peripherals must be able to wale the processor from Deep Sleep mode when they assert an interrupt to be serviced.

Thus, what is needed is a solution for powering down a digital integrated circuit device for reduced standby power consumption while retaining the integrity of the operating state. What is further needed is a solution for powering down the device without imposing burdensome trace routing requirements on the integrated circuit die layout.

SUMMARY OF THE INVENTION

Embodiments of the present invention provides a method and system for powering down an integrated circuit device for reduced standby power consumption while retaining the integrity of the operating state. Embodiments of the present invention further provide a solution for powering down the integrated circuit device without imposing burdensome trace routing requirements on the integrated circuit die layout.

In one embodiment, the present invention is implemented as an integrated circuit device having a power circuit for maintaining asserted values on input output pins of the device when one or more functional blocks of the device are placed in a low-power sleep mode (e.g., deep sleep, etc.). The integrated circuit device includes a power circuit, or power ring, disposed along the periphery of the device. This power circuit is configured to maintain power when the device is placed in the low-power mode, where, for example, the core of the device is shut down. A plurality of input output blocks are included in the integrated circuit device and are for receiving and sending external inputs and outputs for the device. When the integrated circuit device enters the low-power mode, the core of the device is shut down and those input output blocks which are not needed are also shut down. The power circuit is coupled to provide power to at least one of the input output blocks, thereby allowing the block to maintain state when the rest of the device may be shut down. This allows the device to maintain state and to detect signals via at least one of the input output blocks, thereby allowing the device to receive a wake-up signal and wake up from the low-power mode.

In one embodiment, the integrated circuit device further includes a signal routing path disposed along the periphery of the device. The signal routing path is coupled to receive power from the power circuit and to route signals from the input output blocks. The power from the power circuit enables the reception of a wake-up signal from an external source when the integrated circuit device is in the low-power mode.

In one embodiment, the power circuit further comprises a plurality of segments. Each of the segments are disposed along the periphery of the integrated circuit device. A first set of the segments are powered segments and a second set of the segments can be unpowered segments, wherein the unpowered segments do not receive power when the integrated circuit device is in the low-power mode. Accordingly, for example, those input output blocks that are coupled to unpowered segments are shut down when the device is in the low-power mode.

In this manner, the signal state of the input output pins can be maintained as the core functional blocks of the integrated circuit device are powered down. Upon exit from sleep mode (e.g., wake up), the input output pins can resume being driven by the one or more functional blocks. Additionally, this invention minimizes the routing of multiple signals from a special power domain to the input output pin, which greatly reduces signal trace routing requirements.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device (e.g., system 100 of FIG. 1), that manipulates and transforms data represented as physical (electronic) quantities within the computer system's registers and memories into other data similarly represented as physical quantities within the computer system memories or registers or other such information storage, transmission or display devices.

Figure 1:
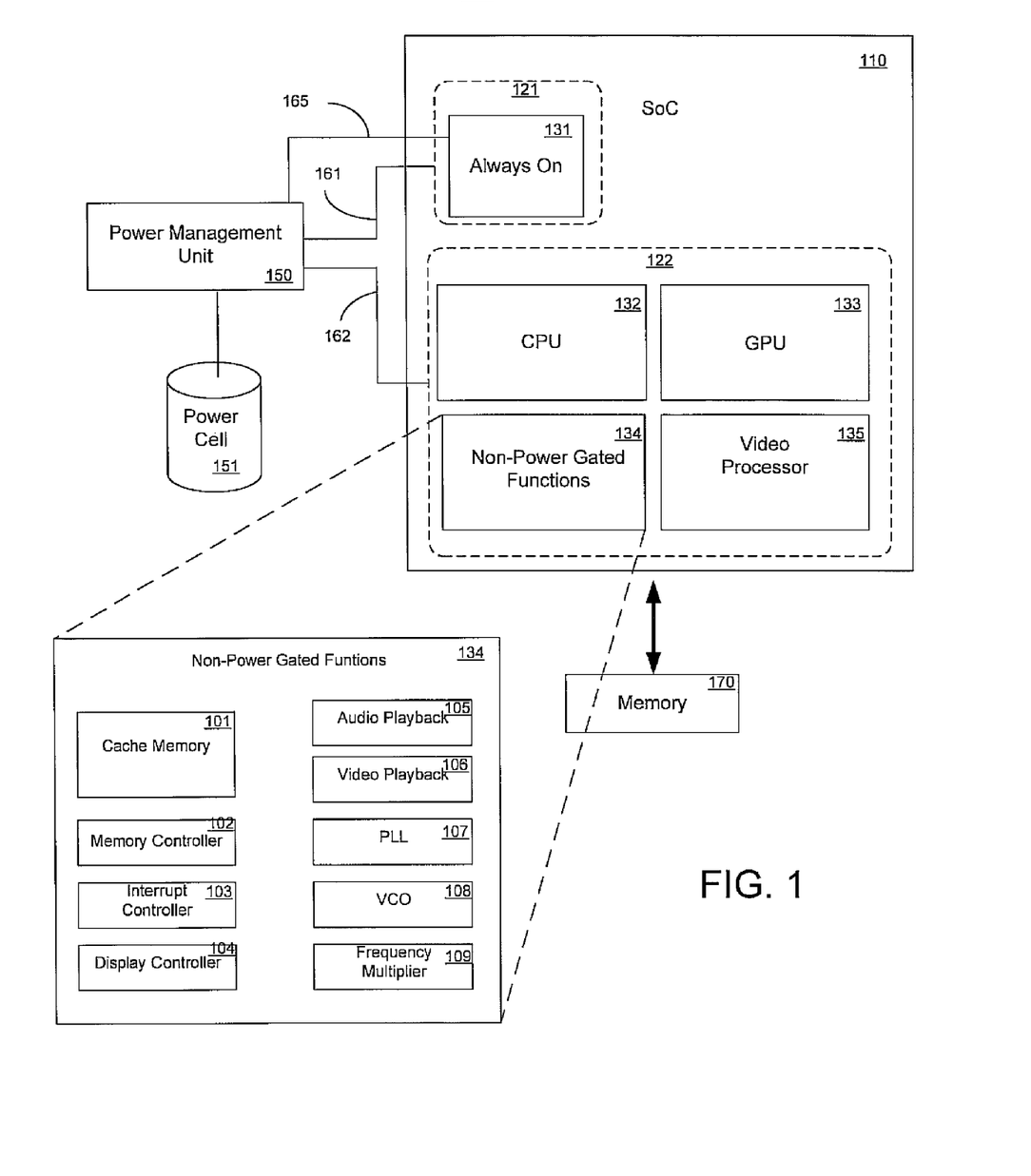
FIG. 1 shows a diagram of an exemplary generalized system architecture in accordance with one embodiment of the present invention.

FIG. 1 shows a diagram of an exemplary generalized system architecture 100 in accordance with one embodiment of the present invention. As depicted in FIG. 1, system 100 includes a programmable SOC (system on a chip) integrated circuit device 110 which includes a plurality of power domains 121-122.

The SOC 110 includes an architecture that is optimized along multiple power domains to enable an optimized power consumption versus performance profile. In the FIG. 1 embodiment, each of the power domains 121 and 122 are coupled to a dedicated voltage rail 161-162. This allows power to be supplied to one power domain independently with respect to the other power domain. The voltage rails 161-162 are individually powered by an external power source, the power management unit 150.

Each of the power domains 121-122 includes at least one power island. The power islands 131-135 are shown. The power islands are configured to receive power from the particular power domain in which they reside. Power islands are distinguished from power domains, in part, by the characteristic that power islands are not supplied their own dedicated voltage rail.

A power island typically comprises a set of components (e.g., sequential logic, storage, interconnects, etc.) that can be power gated with respect to the power domain. As used herein, power gating refers to the connecting or disconnecting of a power island to or from the power circuits of a power domain. The connecting and disconnecting in power gating is typically implemented using CMOS gating logic. It should be noted, however, that there exists a variety of different power optimizations that could be utilized. Such optimizations could exist independently per island with respect to other optimizations (e.g., foreword or back biasing, etc.).

Each of the power islands 131-135 includes one or more functional blocks. The multiple functional blocks 101-109 comprising the non-power gated functions island are shown as an example. The functional blocks 101-109 show the attribute where more than one functional block can reside within a given power island. The functional blocks draw their power from the circuits of the power island in which they reside. When a power island is shut down, each of the functional blocks that are within that power island are also shut down.

Each functional block typically comprises special-purpose logic, storage, hardware resources, and the like that is configured to provide a specific device functionality. Each of the functional blocks are purposely designed and optimized to excel at accomplishing a block specific intended task. The intended tasks are sufficiently granular such that particularly demanding tasks can be performed by using a greater number of functional blocks, while comparatively simple tasks can be performed by using a lesser number of functional blocks. For example, some tasks may only require a single functional block for implementation.

The integrated circuit device 100 optimizes performance versus power consumption by intelligently adjusting power consumption in relation to a requested device functionality. Typical requested device functionality can include, for example, applications such as MP3 playing, video playing, 3-D gaming, GPS navigation, and the like. To provide the requested device functionality, only those functional blocks that are needed are turned on and used. Those functional blocks that are needed will consume power from their respective power islands, which in turn will consume power from their respective power domains. Unneeded functional blocks are shut down.

As depicted in FIG. 1, system 100 embodies a programmable SOC integrated circuit device 110 which includes a two power domains 121 and 122. The power domain 121 includes an "always on" power island 131. The power domain 122 is referred to as the core of the SOC and includes a CPU power island 132, a GPU power island 133, a non-power gated functions island 134, and a video processor island 135.

The FIG. 1 embodiment of the system architecture 100 is targeted towards the particular intended device functions of a battery-powered handheld SOC integrated circuit device. The SOC 110 is coupled to a power management unit 150, which is in turn coupled to a power cell 151 (e.g., one or more batteries). The power management unit 150 is coupled to provide power to the power domain 121 and 122 via the dedicated power rail 161 and 162, respectively. The power management unit 150 functions as a power supply for the SOC 110. The power management unit 150 incorporates power conditioning circuits, voltage pumping circuits, current source circuits, and the like to transfer energy from the power cell 151 into the required voltages for the rails 161-162.

The always on power island 131 of the domain 121 includes functionality for waking up the SOC 110 from a sleep mode. For example, in one embodiment, the always on domain 121, is configured to consistently have power applied to its constituent circuits. For example, the constituent circuits of the power domain 121 can be configured to draw power from the voltage rail 161 and to receive a clock signal in an uninterrupted manner. This enables the power domain 121 to execute sequential state machine logic, instructions, etc. while the rest of the SOC 110 is powered down. This can allow, for example, an internal state machine within the power domain 130 to detect wake event signals, the signals indicating a wale up from the sleep mode. For example, in a deep sleep mode, the voltage rail 162 and the domain 122 can be shut down. The components of the always on domain 121 will remain active, waiting for a wake-up signal.

The CPU power island 132 is within the domain 122. The CPU power island 132 provides the computational hardware resources to execute the more complex software-based functionality for the SOC 110. Such software functionality includes executing the operating system software, specific application software, and the like. Additionally, the CPU power island 132 executes special interrupt handling software that helps the SOC 110 respond to external events.

The GPU power island 133 is also within the domain 122. The GPU power island 133 provides the graphics processor hardware functionality for executing 3-D rendering functions. The three rendering functions include rendering realtime 3-D images as produced by a gaming application, rendering 3-D symbology as used by a mapping application, and the like.

The video processor island 135 is also within the domain 122. The video processor island 135 provides specialized video processing hardware for the encoding of images and video. The hardware components of the video processor island 135 are specifically optimized for performing realtime video encoding, which can be a computationally intensive task. Additionally, the video processor island 135 can also incorporate hardware specifically tailored for decompressing and rendering high-definition video. In the present embodiment, all modules that are used for video capture are included in the video processor island 135, including the image processing functional blocks that convert the data received from an image capture sensor (e.g., image capture device 507 of FIG. 5) that converts it into pixel data and ready for encoding.

The non-power gated functions island 134 is also within the domain 122. In the present embodiment, the term "non-power gated functions" refers to the characteristic that the island 134 does not include any power gating logic or components for turning off the island 134 when the domain 122 is on. Consequently, whenever the domain 122 is on, the non-power gated functions island 134 is also on. This characteristic allows the non-power gated functions island 134 to consolidate those hardware functions that tend to be common across the different use case scenarios of the SOC 110. For example, across the range of intended device functions, certain components will tend to always be needed. These components can be concentrated within the non-power gated functions island 134, and thereby simplify the implementation of the other islands 132, 133, and 135.

The memory 130 is an external memory that is coupled to the SOC 110. The memory 130 provides the execution environment for the CPU island 132. In typical usage scenarios, the operating system software and/or application software is instantiated within the memory 130. In one embodiment, the memory 130 is implemented as a specialized DRAM that can enter a self refresh mode. In such an embodiment, the volatile memory 130 can be set to self refresh and thereby maintain its content independent of the memory controller as the SOC 110 is placed into sleep mode.

Figure 2:
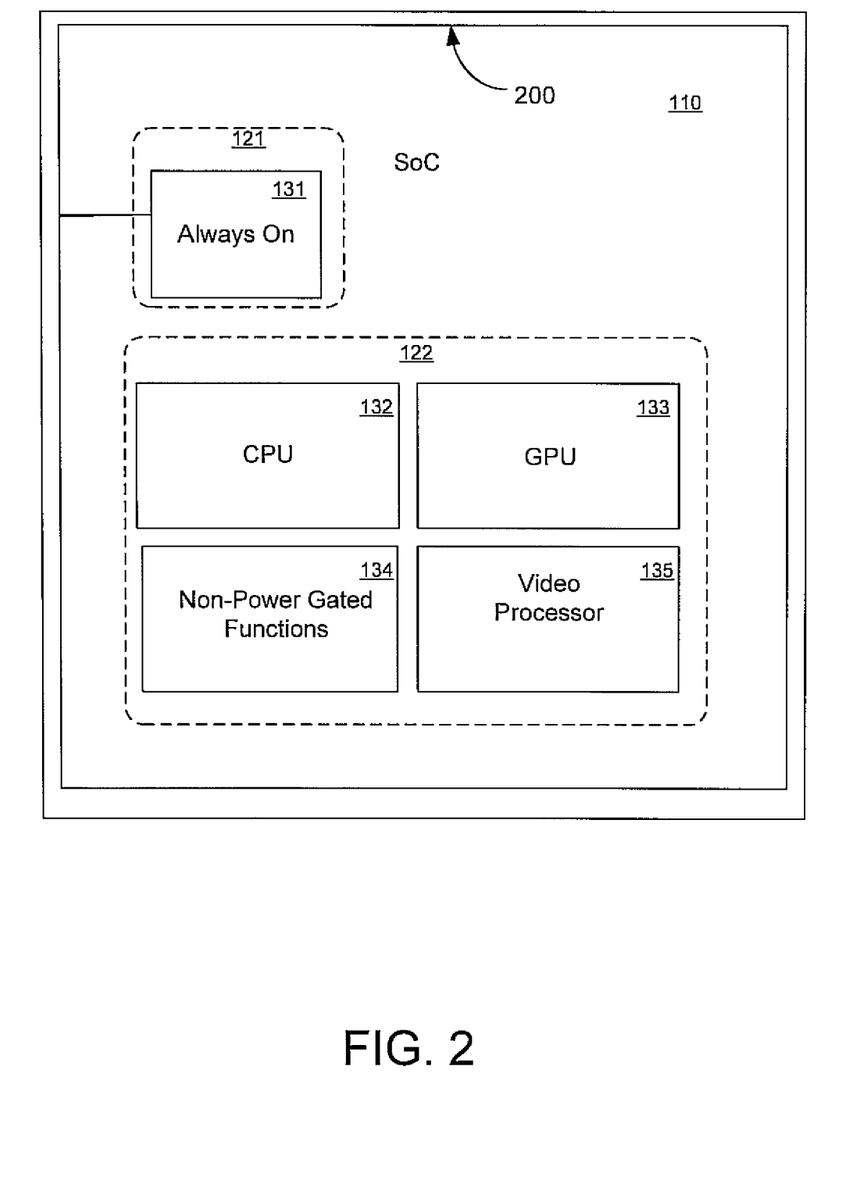
FIG. 2 shows the programmable system on a chip with a power ring in accordance with one embodiment of the present invention.

FIG. 2 shows the programmable system on a chip 110 with a power ring 200 in accordance with one embodiment of the present invention. As depicted in FIG. 2, the power ring 200 runs along the periphery of the integrated circuit device 110 and is connected to the always on power island 131 of the always on power domain 121.

As shown in FIG. 2, the programmable SOC 110 integrated circuit device includes the power ring 200 for optionally maintaining asserted values on an input output pin of the device when a functional block of the device is placed in a sleep mode. The SOC utilizes the power ring as a power distributing circuit, or simply a power circuit, that is disposed along the periphery of the device, and is optimized to occupy as little semiconductor die area as possible. This power ring is coupled to the always on power domain and is configured to maintain power when the device is placed in a low-power mode, while, for example, the core domain 122 of the device is shut down.

Figure 3:
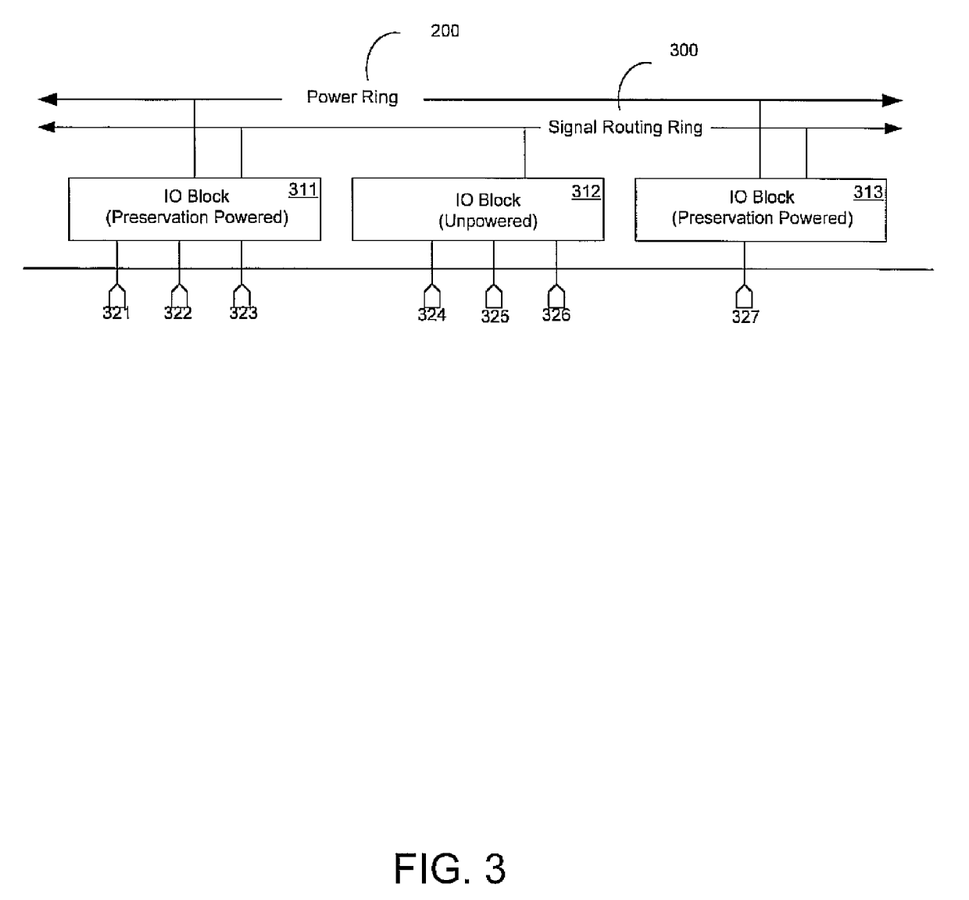
FIG. 3 shows a more detailed diagram of a portion of the power ring in accordance with one embodiment of the present invention.

FIG. 3 shows a more detailed diagram of a portion of the power ring 200 in accordance with one embodiment of the present invention. As depicted in FIG. 3, the power ring is shown alongside a corresponding signal routing ring 300. A plurality of input output blocks 311-313 are also shown.

As shown in the FIG. 3 embodiment, a plurality of input output blocks are included in the SOC and are for receiving external inputs for the device and for providing outputs from the device. This is shown as the input output pins 321-327. When the SOC device enters the low-power mode, the core of the device is shut down and those input output blocks which are not needed are also shut down. The power circuit is coupled to provide power to at least one of the input output blocks to maintain state when the integrated circuit device is in the low-power mode. Generally, at least one of the input output blocks needs to be kept alive during low-power mode in order to receive any wake signals from the outside world, although, depending upon the particular implementation, an internal timer or other sequencer within the always on domain can alternatively provide a wake-up signal independent of any external I/O. The "keep alive" current is provided by the connection to the power ring. This allows the SOC device to maintain state and to detect signals via the one or more "keep alive" input output blocks, thereby allowing the device to receive a wake-up signal and wake up from the low-power mode.

As shown in FIG. 3, the SOC device further includes the signal routing ring 300 disposed along the periphery of the device. The signal routing ring comprises a signal transmission and routing path that is coupled to receive power from die power ring and to route signals to or from the input output blocks. The power from the power circuit enables the reception of a wake-up signal from an external source when the integrated circuit device is in the low-power mode. Additionally, power from the power circuit enables the retention of output state in order to maintain the proper operation of peripheral devices that may be coupled to the SOC device.

In one embodiment, the power circuit further comprises a plurality of segments. Instead of one continuous ring that provides power to input output blocks along the entire periphery of the SOC device, the power circuit can include numerous segments, some of which can be powered in low-power state and some of which can be shut down. Each of the segments are disposed along the periphery of the integrated circuit device. For example, in an exemplary embodiment, a first set of the segments are powered segments and a second set of the segments can be unpowered segments. The unpowered segments do not receive power when the integrated circuit device is in the low-power mode.

Accordingly, for example, consider a case where the input output block 312 comprises an unpowered segment. The input output block 312 is not coupled to the power ring 200. Those input output pins of the block 312 are typically shut down when the device enters the low-power mode. Such segments are generally configured in HW to always be shut down during Deep Sleep. It should be noted, however, that there can also be certain IO rails that may be programmatically shut down relative to a particular use case scenario during sleep mode. In such a case, there is a portion of the block 312 that is on the AO rail and is maintained. It is the portion of the block 312 that is powered by the IO rail that is shut down.

In this manner, the signal state of certain selected input output pins can be maintained as the core functional blocks of the integrated circuit device are powered down. Upon exit from sleep mode (e.g., wake up), the input output pins can resume being driven by the one or more functional blocks. Additionally, this invention minimizes the routing of multiple signals from a special power domain to the input output pin, which greatly reduces signal trace routing requirements.

Figure 4:
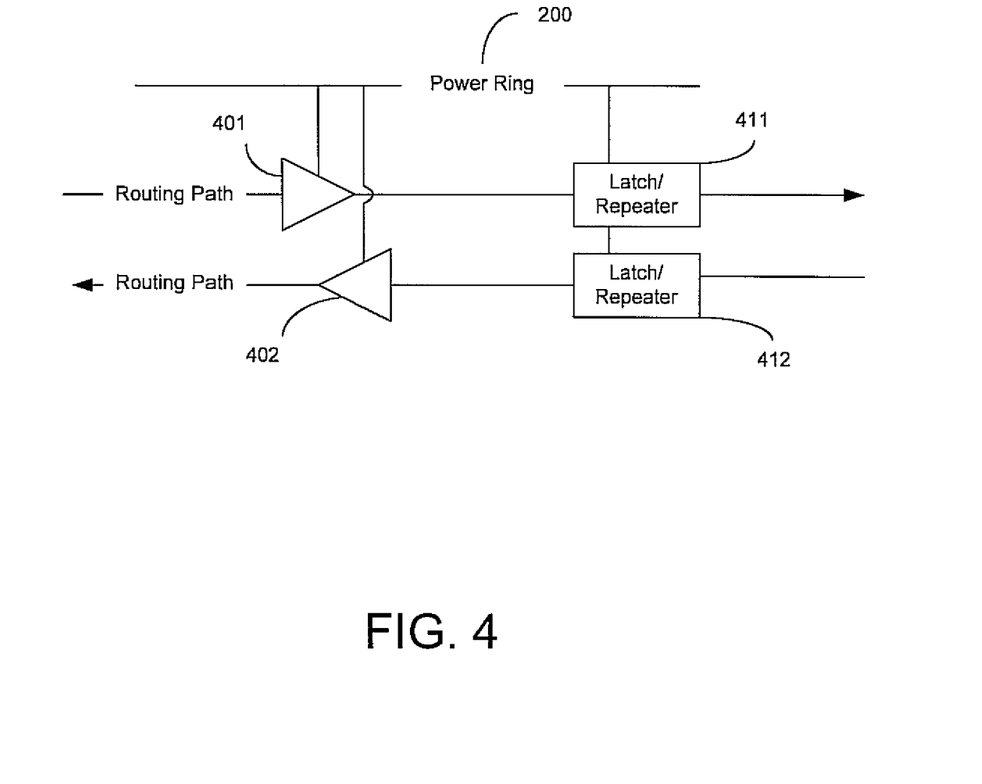
FIG. 4 shows a diagram of exemplary components comprising a signal routing path in accordance with one embodiment of the present invention.

FIG. 4 shows a diagram of exemplary components comprising the signal routing path in accordance with one embodiment of the present invention. As depicted in FIG. 4, the signal routing path is bidirectional, as shown by the buffers 401-402. The buffers are used to drive the signal across those unpowered segments or across any long stretches of semiconductor die where signal integrity must be maintained. The latch/repeaters 411-412 can be optionally included and can be used to latch and repeat the signal to more readily traverse long traces. It should be noted that the buffers 401-402 are both coupled to the power ring 200, along with the latch/repeaters 411-412.

It should be noted that in general, to minimize current in low-power mode, the input output blocks, power ring, and signal routing ring comprising the always on powered regions are minimized in area and optimized to use the lowest leakage/power cells. For example, depending upon the particular application, these regions can be as small as the logic around a single IO, a series of IOs common to an interface, or a set of "branches" that surround the core as opposed to a ring.

One advantage of a powered ring surrounding the core is that it greatly simplifies the routing of sleep/wake controls to all input output blocks that will remain active during deep sleep. The power ring is a more readily implementable architecture since buffers can be used to repeat signals around the periphery of the chip. As described above, for those regions of IOs that do not need to be active during sleep mode, the ring is broken into segments which are separated by regions of unpowered logic/IOs. The powered buffers are used to repeat signals across particularly long unpowered regions.

It should be noted that in one embodiment, level shifters can be implemented between power domains that are At different voltages. For example, in one embodiment, the always on voltage and core voltage are required to closely track to one another in order to minimize leakage between the domains on signals that pass between them. In an alternative embodiment, level shifters can be used to transfer signals between the domains when they are at different voltages.

Figure 5:
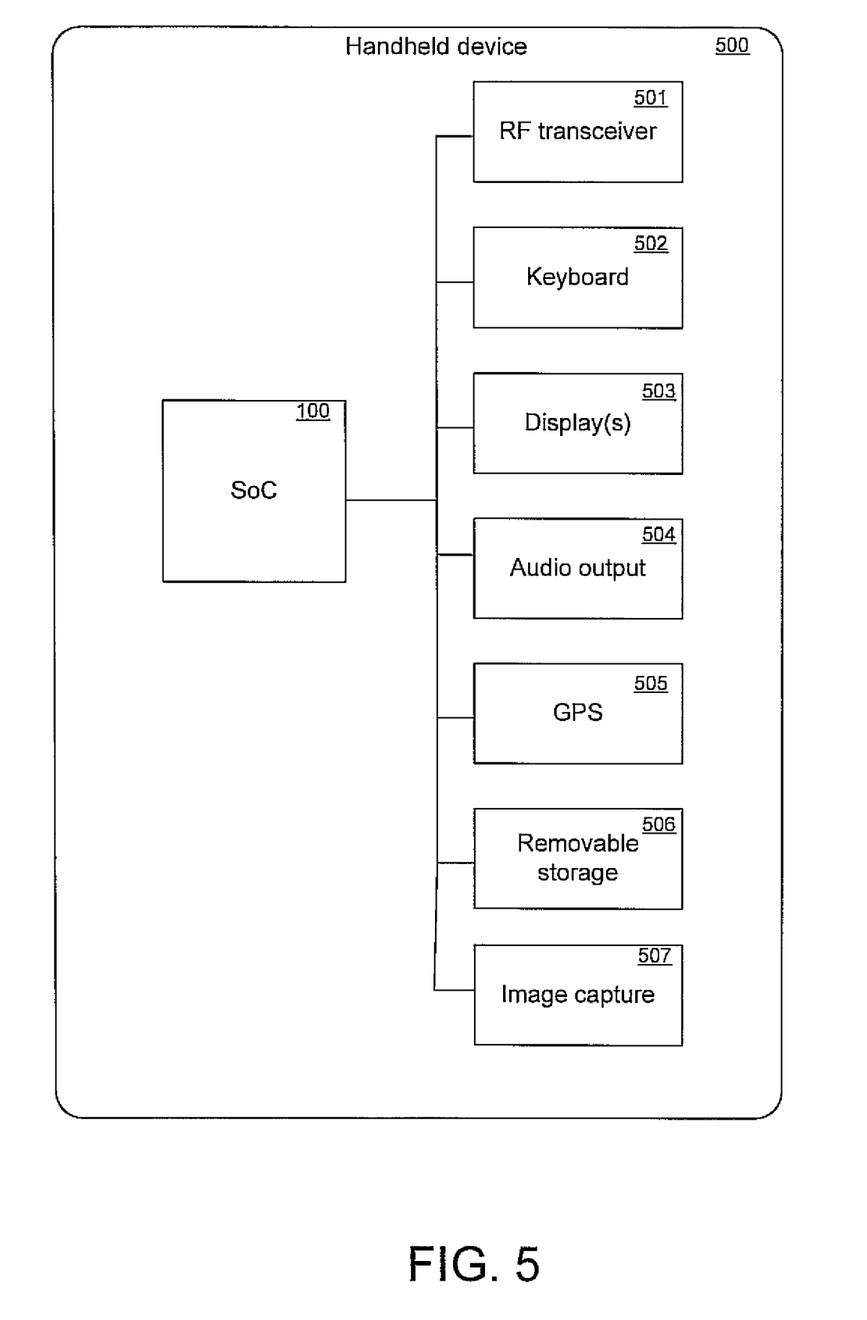
FIG. 5 shows a diagram showing the components of a handheld device in accordance with one embodiment of the present invention.

FIG. 5 shows a diagram showing the components of a handheld device 500 in accordance with one embodiment of the present invention. As depicted in FIG. 5, a handheld device 500 includes the system architecture 100 described above in the discussion FIG. 1. The handheld device 500 shows peripheral devices 501-507 that add capabilities and functionality to the device 500. Although the device 500 is shown with the peripheral devices 501-507, it should be noted that there may be implementations of the device 500 that do not require all the peripheral devices 501-507. For example, in an embodiment where the display(s) 503 are touch screen displays, the keyboard 502 can be omitted. Similarly, for example, the RF transceiver can be omitted for those embodiments that do not require cell phone or WiFi capability. Furthermore, additional peripheral devices can be added to device 500 beyond the peripheral devices 501-507 shown to incorporate additional functions. For example, a hard drive or solid state mass storage device can be added for data storage, or the like.

The RF transceiver 501 enables two-way cell phone communication and RF wireless modem communication functions. The keyboard 502 is for accepting user input via button pushes, pointer manipulations, scroll wheels, jog dials, touch pads, and the like. The one or more displays 503 are for providing visual output to the user via images, graphical user interfaces, full-motion video, text, or the like. The audio output component 504 is for providing audio output to the user (e.g., audible instructions, cell phone conversation, MP3 song playback, etc.). The GPS component 505 provides GPS positioning services via received GPS signals. The GPS positioning services enable the operation of navigation applications and location applications, for example. The removable storage peripheral component 506 enables the attachment and detachment of removable storage devices such as flash memory, SD cards, smart cards, and the like. The image capture component 507 enables the capture of still images or full motion video. The handheld device 500 can be used to implement a smart phone having cellular communications technology, a personal digital assistant, a mobile video playback device, a mobile audio playback device, a navigation device, or a combined functionality device including characteristics and functionality of all of the above.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An integrated circuit device, comprising:
a power circuit configured to maintain asserted values on an input output pin of the device when a functional block of the device is placed in a sleep mode, wherein the power circuit is disposed along a periphery of an integrated circuit device and the power circuit is configured to maintain power when the integrated circuit device is placed in a low-power mode, wherein the power circuit comprises a plurality of segments along the periphery of the integrated circuit device, and wherein a first set of the plurality of segments are powered segments and a second set of the plurality of segments are unpowered segments, and wherein the unpowered segments do not receive power when the integrated circuit device is in the low-power mode;
input output blocks for receiving external inputs for the integrated circuit device and for providing outputs from the integrated circuit device, wherein the power circuit is coupled to provide power to at least one of the input output blocks to maintain state when the integrated circuit device is in the low-power mode; and
a signal routing path disposed along the periphery of the integrated circuit device, the signal routing path is configured to: route signals from the input output blocks; and
receive power from the power circuit to enable the reception of a wake-up signal from an external source when the integrated circuit device is in the lower-power mode.

2. The integrated circuit device of claim 1, further comprising:
a core coupled to the input output blocks, the core having a plurality of functional blocks, wherein at least one of the functional blocks is a processor, and wherein the core is shut down when the integrated circuit device is in the low-power mode.

3. The integrated circuit device of claim 1, wherein the input output blocks are configured to minimize leakage current when the integrated circuit device is in the low-power mode.

4. The integrated circuit device of claim 1, wherein the signal routing path includes a plurality of buffers sending and receiving signals across the unpowered segments when the integrated circuit device is in the low-power mode.

5. A system on a chip (SOC) comprising:
an always on power domain;
a core power domain, the core power domain further comprising a computer readable memory storing computer readable code, and a processor coupled to the computer readable memory and for executing a computer readable code;
a power ring coupled to the always on power domain and disposed along a periphery of an integrated circuit device, the power ring configured to maintain power when the integrated circuit device is placed in a low-power mode, wherein the system is configured to enter a sleep mode and exit sleep mode, wherein the power ring comprises a plurality of segments along the periphery of the SOC, and wherein a first set of the plurality of segments are powered segments and a second set of the plurality of segments are unpowered segments, and wherein the unpowered segments do not receive power when the SOC is in the low-power mode;
input output blocks for receiving external inputs for the integrated circuit device and for providing outputs from the integrated circuit device, wherein the power ring is coupled to provide power to at least one of the input output blocks to maintain state when the integrated circuit device is in the low-power mode; and
a signal routing path disposed along the periphery of the SOC, the signal routing path configured to: route signal from the input output blocks; and
receive power from the power ring to enable the reception of a wake-up signal from an external source when the SOC is in the low-power mode.

6. The SOC of claim 5, wherein the core is shut down when the SOC is in the low-power mode.

7. The SOC of claim 5, wherein the input output blocks are configured to minimize leakage current when the SOC is in the low-power mode.

8. A battery-powered handheld device, comprising:
- a programmable system on a chip (SOC) integrated circuit device;
- plurality of power domains included within the integrated circuit device, each of the power domains having a respective voltage rail to supply power to the power domain, wherein one of the power domains is an always on power domain and is configured to control turning power off and turning power on for a remaining one or more power domains;
- a plurality of functional blocks included within the integrated circuit device, wherein each power domain includes at least one functional block
- a power circuit coupled to the always on power domain and disposed along a periphery of the integrated circuit device, the power circuit configured to maintain power when the integrated circuit device is placed in a low-power mode, wherein the power circuit comprises a plurality of segments along the periphery of the integrated circuit device, and wherein a first set of the plurality of segments are powered segments and a second set of the plurality of segments are unpowered segments, and wherein the unpowered segments do not receive power when the integrated circuit device is in the low-power mode;
- a plurality of input output blocks for receiving external inputs for the integrated circuit device and for providing outputs from the integrated circuit device, wherein the power circuit is coupled to provide power to at least one of the input output blocks to maintain state when the integrated circuit device is in the low-power mode; and
- a signal routing oath disposed along the periphery of the SOC, the signal routing path configured to: route signal from the input output blocks; and
- receive power from the power ring to enable the reception of a wake-up signal from an external source when the SOC is in the low-power mode.

9. The device of claim 8, wherein the core is shut down when the SOC is in the low-power mode.

10. The device of claim 8, wherein the input output blocks are configured to minimize leakage current when the SOC is in the low-power mode.

11. The device of claim 10 wherein the input output blocks are configured to minimize leakage current by using back biasing.

12. The device of claim 8, wherein the power circuit maintains retention of output state in order to maintain proper operation of a peripheral device coupled to the SOC integrated circuit device.

13. The SOC of claim 5, wherein the signal routing path includes a plurality of buffers sending and receiving signals across the unpowered segments when the integrated circuit device is in the low-power mode.

14. The device of claim 8, wherein the signal routing path includes a plurality of buffers sending and receiving signals across the unpowered segments when the integrated circuit device is in the low-power mode.

* * * * *